(12) United States Patent
Hashimoto et al.

(10) Patent No.: US 6,787,266 B1
(45) Date of Patent: Sep. 7, 2004

(54) BATTERY PLATE AND BATTERY

(75) Inventors: Tatsuya Hashimoto, Hyogo (JP); Hiroyuki Murai, Osaka (JP); Yorihito Ohana, Osaka (JP); Hiroshi Matsuno, Osaka (JP); Hideya Asano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/463,565

(22) PCT Filed: May 27, 1999

(86) PCT No.: PCT/JP99/02828

§ 371 (c)(1),
(2), (4) Date: Apr. 21, 2001

(87) PCT Pub. No.: WO99/62133

PCT Pub. Date: Feb. 12, 1999

(30) Foreign Application Priority Data

May 28, 1998 (JP) ............................................ 10/147117

(51) Int. Cl.[7] .................................................. H01M 4/66
(52) U.S. Cl. ........................ 429/245; 429/213; 429/234; 429/247; 429/251; 429/126.4; 429/228; 204/38 A; 204/58; 29/623.5
(58) Field of Search ................................ 429/245, 213, 429/234, 247, 251, 126.4, 228; 204/38 A, 58; 29/623.5

(56) References Cited

U.S. PATENT DOCUMENTS

| | | | | |
|---|---|---|---|---|
| 2,859,148 A | * | 11/1958 | Altenpohl et al. | ........... 148/275 |
| 4,105,511 A | * | 8/1978 | Nikaido et al. | ................ 205/50 |
| 6,153,337 A | * | 11/2000 | Carlson et al. | ............. 429/247 |
| 6,210,831 B1 | * | 4/2001 | Gorkovenko et al. | ....... 429/213 |

FOREIGN PATENT DOCUMENTS

| | | |
|---|---|---|
| JP | 56-57261 | 5/1981 |
| JP | 1-120759 | 5/1989 |
| JP | 4237955 | 8/1992 |
| JP | 7-135023 | 5/1995 |
| JP | 8-190912 | 7/1996 |
| JP | 9-63564 | 3/1997 |

OTHER PUBLICATIONS

Japanese search report for PCT/JP99/02828 dated Aug. 24, 1999.
English translation of Form PCT/ISA/210.
* cited by examiner Primary Examiner—Randy Gulakowski
(74) Attorney, Agent, or Firm—RatnerPrestia

(57) ABSTRACT

A battery, in which measures are taken to suppress a reduction in charge/discharge capacity and degradation of load characteristics due to peeling of an active material off the current collector during repeated charging and discharging, is disclosed. Boehmite treatment or chromate treatment of the current collector surface of the electrode plate for the battery suppresses the degradation of charge/discharge capacity and load characteristics.

20 Claims, 2 Drawing Sheets

1. Electrode Plate for Positive Electrode
2. Electrode Plate for Negative Electrode
3. Separator
4. Battery Case
5. Sealing Plate
6. Gasket
7. Positive Electrode Lead
8. Negative Electrode Lead
9. Upper Insulating Plate
10. Lower Insulating Plate

BATTERY PLATE AND BATTERY

This Application is a U.S. National Phase Application of PCT International Application PCT/JP99/02828.

FIELD OF THE INVENTION

The present invention relates to improvements in electrode plates for battery and a battery using the improved electrode plates for battery.

BACKROUND OF THE INVENTION

In order to prevent falling of an active material off a current collector of a battery due to usage of repeated charge/discharge operations or during the assembly work of batteries, an application of a chromate treatment or a corona discharge treatment to the surface of the current collector has so far been proposed. (The Japanese Patent Unexamined Publication Nos. S56-57261 and H7-135023) Also, relative to the manufacturing of electrode plates for a lithium-ion secondary battery, a method of performing dispersion by kneading under the presence of a surface-active agent is disclosed as the method for improving the wettability of an active material against a bonding agent and a viscosity improver. (The Japanese Patent Unexamined Publication No. H8-190912)

However, it is found difficult for the foregoing electrode plates for battery to achieve an improvement in wettability of an active material against a bonding agent and a viscosity improver and also to satisfy the required adhesiveness between a current collector and an active material after the active material has been applied to the current collector. As a result, after a storage under high temperatures or during repeated charge/discharge operations, the active material peels and falls off the current collector, thereby causing the problem of a reduction in charge/discharge capacity.

The present invention deals with the foregoing unsettled problem to realize a lithium-ion secondary battery which shows minimal corrosion of a current collector due to an active material, minimal peeling and falling of the active material off the current collector, thereby demonstrating large discharge capacity.

DISCLOSURE OF THE INVENTION

The present invention deals with the afore-mentioned problem to provide an electrode plate for battery and a battery using it, the electrode plate for battery being characterized by applying a boehmite treatment to the surface of a current collector prior to an application of a paste, which is formed of a composition with an active material acting as the principal ingredient, to the current collector.

With a method for producing electrode plates for lithium secondary battery characterized by applying a paste containing a positive electrode active material to a current collector formed of a metallic foil and then drying the paste, the current collector is applied with a chromate treatment on the surface thereof to form a chrome oxide layer prior to the foregoing application of the paste.

The present invention discloses a method for producing electrode plates, the method comprising the steps of:

applying a boehmite treatment to the surface of current collector of one electrode plate selected from a positive electrode plate and a negative electrode plate or applying a chromate treatment to the surface of a positive electrode current collector;

applying a paste formed of a composition containing an electrode active material on the current collector; and drying the paste.

Even when a battery employing the electrodes as described in the above is in usage with repeated charge/discharge operations, a reduction in the charge/discharge capacity and degradation in the load characteristics can be suppressed to a minimum.

DETAILED DESCRIPTION OF PREFERRED EMBODIMENTS

Next, a description is given to a case where a boehmite treatment is applied to a positive electrode current collector for lithium-ion battery in an exemplary embodiment of the present invention.

First Exemplary Embodiment

Figure 1:
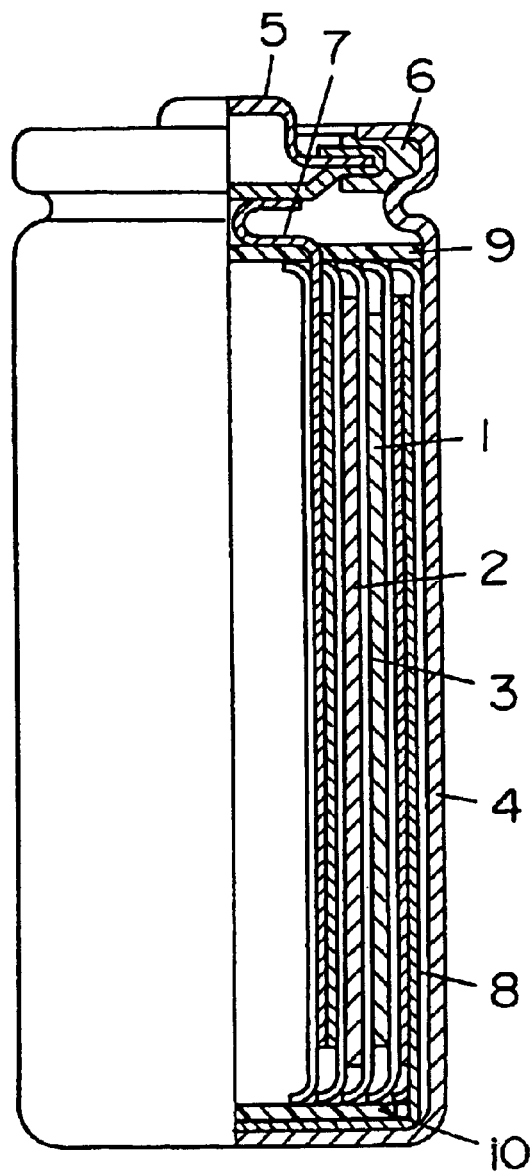
FIG. 1 is a cross-sectional view of a battery in an exemplary embodiment of the present invention.

A lithium-ion secondary battery in an exemplary embodiment of the present invention is a cylindrical lithium-ion secondary battery as shown in FIG. 1 and formed of a group of electrode plates produced according to the method as disclosed by the present invention, an electrolyte and a battery case accommodating the foregoing. The group of electrode plates includes a sheet like electrode plate 1 for positive electrode, a sheet like electrode plate 2 for negative electrode, a sheet like separator 3 insulating the electrode plate 1 for positive electrode from the electrode plate 2 for negative electrode, a positive electrode lead 7, a negative electrode lead 8, an upper insulating plate 9 and a lower insulating plate 10. The separator 3 is a porous polyethylene film. All of the foregoing elements are superimposed one over another, wound in a spiral fashion and placed inside the cylindrical battery case 4.

The battery case 4 is prepared by applying a deep drawing process to a stainless steel sheet having resistance to an organic electrolyte. After the group of electrode plates and electrolyte have been placed inside the battery case 4, the opening of the battery case 4 is closed by sealing with a sealing plate 5 and a gasket 6 that acts as an insulator and also applies gas sealing between the sealing plate 5 and the battery case 4.

Now, a description is given to a boehmite treatment. After a 30 $\mu$m thick aluminum foil acting as a positive electrode current collector has been immersed in a 12 cc/l solution of triethanolamine, an oxide film is formed by drying the foregoing aluminum foil for 4 hours at 100° C. to have the surface of the aluminum foil reformed. At this time, the thickness of the oxide film is preferred to be 0.5 to 5.0 $\mu$m. When the thickness of the oxide film is smaller than 0.5 $\mu$m, a sufficient effect of reforming the surface of the aluminum foil is not allowed to be realized, resulting in not so excellent adhesion with an active material. On the other hand, when the thickness of the oxide film exceeds 5.0 $\mu$m, the amount of the active material, which is allowed to be contained in the given same size of the battery case 4, is reduced, resulting in an excessive reduction of the battery capacity to cause an unacceptably large adverse effect.

Next, a description is given to a method for producing the electrode plate 1 for positive electrode. A paste formed of composition with an active material for positive electrode serving as the principal ingredient is prepared by mixing/dispersing 50 weight parts $LiCoO_2$ powder as the positive electrode active material, 1.5 weight parts acetylene black as a conductive agent, 7 weight parts aqueous solution of 50 weight parts PTFE as a binder and 41.5 weight parts aqueous solution of 1 weight part carboxylmethylcellulose as a viscosity improver. The paste for positive electrode thus prepared is applied to both surfaces of the boehmite treated aluminum foil by using a die coater and, after the coated paste has been dried, the aluminum foil applied with the paste is heated to the melting temperature of PTFE ranging 200° C. to 300° C., thereby further improving the adhesion between the current collector and the positive electrode composition layer. Then, the aluminum foil is rolled to a thickness of 0.18 mm and cut to produce the sheet like electrode plate 1 for positive electrode of the present invention.

A description is given to a method for producing the electrode plate 2 for negative electrode. A paste for negative electrode is prepared by mixing/dispersing 50 weight parts powder of scale like graphite particles acting as the negative active material, 45 weight parts aqueous solution prepared by dissolving 1 weight part carboxymethylcellulose in 99 weight parts water to form a viscosity improver and 5 weight parts styrene-butadiene-rubber as a binder. The paste thus prepared is applied to a 40 µm thick copper foil by using a die coater to produce the electrode plate 2 for negative electrode.

The electrolyte is prepared by dissolving $LiPF_6$ in a mixed solution of 30 vol % ethylene carbonate, 50 vol % diethyl carbonate and 20 vol % methyl propionate to a concentration of 1 mol/l. This electrolyte is contained inside the battery case, in which the positive electrode active material layer and negative electrode active material layer are impregnated with the electrolyte, thereby causing a cell reaction to take place with the electrolyte serving as a carrier of lithium ions between the electrode plate 1 for positive electrode and the electrode plate 2 for negative electrode by passing through minute holes of the porous separator 3.

A battery is prepared by using the foregoing electrode plate 1 for positive electrode and cycle characteristics of the battery are checked. The battery thus prepared measures 17 mm in diameter and 50 mm in height.

A battery for comparison, which is the same as the foregoing battery of the present invention except for using a positive electrode current collector with no boehmite treatment applied to the surface thereof, has been prepared to carry out a side-by-side performance evaluation.

Figure 2:
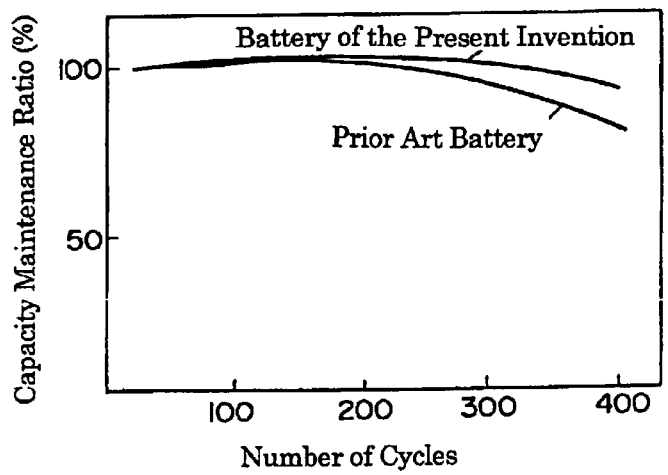
FIG. 2 is a diagram to show cycle life characteristics by making a comparison between a prior art battery and a battery in an exemplary embodiment of the present invention.

The battery of the present invention and the battery for comparison are subjected to a cycle test, one cycle of which comprises the steps of constant current charging at 500 mA until the battery voltage reaches 4.1 V, switching to constant voltage charging when the battery voltage reaches 4.1 V, continuing the constant voltage charging until the total charging time reaches 2 hours, starting discharging at 720 mA in an ambient temperature of 20° C. and suspending the discharging when the discharge voltage decreases to 3.0 V. Upon completing one cycle as above, the next cycle is started. FIG. 2 shows the results of the cycle test, i.e., cycle life characteristics, on the foregoing battery of the present invention and the battery for comparison with a capacity maintenance ratio indicated on the vertical axis and a number of cycles on the horizontal axis when charge/discharge operations as described in the above are repeated. It is found out from FIG. 2 that the battery of the present invention shows little degradation in capacity after repeated charge/discharge operations when compared with the battery for comparison, thereby proving that the battery of the present invention has excellent cycle characteristics.

This is because of the needle like structure formed on the surface of the positive electrode current collector by an application of a boehmite treatment thereto and the enhanced adhesion between the current collector and the composition layer with the active material acting as the principal ingredient, the enhanced adhesion having been realized by the polymeric material of PTFE entangled with the needle like structure in a three-dimensional manner to demonstrate an anchor effect. Therefore, even when the composition layer containing the active material expands/shrinks due to repeated charge/discharge operations, it is hard for the composition layer to get separated from the current collector.

Also, the battery of the present invention and battery for comparison are kept in storage under a charged condition for 20 days at 60° C. and then subjected to several times of repeated charge/discharge operations at room temperature, followed with a discharging operation at 720 mA to find capacity till the time when the battery voltage reaches 3.0 V. The resulting capacity is compared with the capacity just before being kept in storage and Table 1 shows the findings.

TABLE 1

| High Temperature Storage Characteristics | Battery of Present Invention | Battery for Comparison |
| --- | --- | --- |
| (Capacity after Storage/ Capacity before Storage) × 100 (%) | 98 | 93 |

As shown in Table 1, the battery of the present invention is found to show little degradation in capacity even under a high temperature storage condition.

A case, where the boehmite treatment is applied to the positive electrode current collector for a lithium secondary battery, is shown in the present exemplary embodiment but the boehmite treatment is also allowed to be applied to the negative electrode current collector for the same effect, and further the same effect can be gained even when the boehmite treatment is applied to electrode plates of other battery systems.

Second Exemplary Embodiment

The preparation of an electrode plate 1 for positive electrode is made in the same way as in the first exemplary embodiment except for using an aluminum foil, on the surface of which a chromium oxide layer is formed in advance by a chromate treatment, in place of an aluminum foil that is boehmite treated.

A paste for negative electrode used with an electrode plate 2 for negative electrode is prepared according to the same method as employed in the first exemplary embodiment. The obtained paste for negative electrode is applied to both surfaces of a negative electrode current collector formed of a 50 µm thick copper foil by using a die coater and the applied paste is dried. Then, the copper foil is rolled to a thickness of 0.2 mm and cut to produce a sheet like electrode plate 2 for negative electrode.

An electrolyte, which is the same one as used in the first exemplary embodiment, is used in the present exemplary embodiment.

A battery is produced by using the foregoing electrode plate 1 for positive electrode in the same way as the first exemplary embodiment and the cycle characteristics of the battery are checked. The battery thus produced measures 17 mm in diameter and 50 mm in height.

Figure 3:
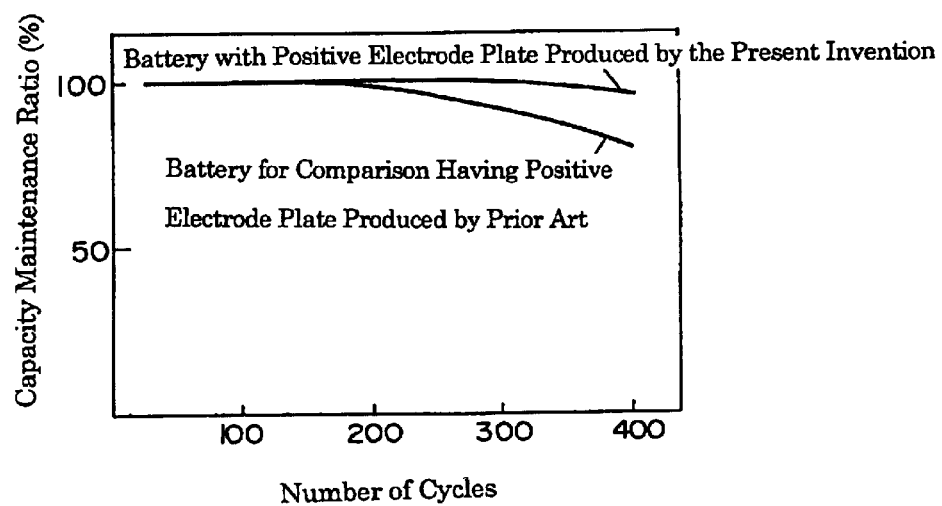
FIG. 3 is a diagram to show cycle life characteristics by making a comparison between a prior art battery and a battery in another exemplary embodiment of the present invention.

As a battery for comparison is used a lithium secondary battery prepared according to the same method as employed in the first exemplary embodiment except for using a positive electrode current collector without applying any chromate treatment to the surface thereof. Then, a comparison is made between the battery for comparison of above and a lithium secondary battery using the positive electrode plate prepared according to the method of the present invention and the cycle characteristics of both batteries are as shown in FIG. 3.

In the same way as in the first exemplary embodiment, the batteries are charged with a constant current of 500 mA and then, when the battery voltage has reached 4.1 V, charging of the batteries is switched to constant voltage charging, the constant voltage being 4.1 V, with the total charging time extended to as long as 2 hours. Discharging of the batteries is performed with a discharge current value of 720 mA at 20° C. and, when the dicharge voltage has reached 3.0 V, the discharge cycle is ended and a new charge cycle is started. What is found out from FIG. 3 is that the lithium secondary battery using the electrode plate for positive electrode produced according to the method of the present invention shows little degradation in capacity in comparison with a lithium secondary battery using the electrode plate for positive electrode prepared according to the conventional method even when a charge/discharge operation is repeated, thus demonstrating excellent cycle characteristics.

This is because of the following reason. The battery using the electrode plate for positive electrode of a lithium secondary battery prepared according to the production method of the present invention shows a reduction in corrosion of the current collector caused by a composition layer since the composition layer with the principal ingredient thereof formed of an active material does not come into a direct contact with the current collector although the surface of the positive electrode current collector is chromate treated and the chromate treated coating on the surface of the current collector is corroded, and further since generation of hydrogen gas, which takes place in the vicinity of an interface between the two different substances at the time of corrosive reaction, can be suppressed, the adhesion between the positive electrode composition layer and the current collector is enhanced, thereby making it hard for the positive electrode composition layer to peel off from the current collector even if the positive electrode composition layer undergoes expansion/shrinkage due to charge/discharge operations of the battery.

In addition, when an aluminum foil is used to form the positive electrode current collector, the surface of the aluminum foil is corroded moderately by the chromate treatment applied thereto, thereby enhancing markedly the adhesion of the positive electrode composition layer to the current collector because of the anchor effect created on the surface of the aluminum foil. On the other hand, when an iron foil is used to form the current collector, the anchor effect due to the chromate treatment is small.

Lithium secondary batteries prepared by the use of these electrode plates for positive electrode are kept in storage under a charged condition for 20 days at 60° C., and then subjected to several times of repeated charge/discharge operations at room temperature, followed with a discharging operation at 720 mA to find capacity till the time when the battery voltage reaches 3.0 V. The resulting capacity is compared with the capacity just before being kept in storage and Table 2 shows the findings.

TABLE 2

| High Temperature Storage Characteristics | Battery of Present Invention | Battery for Comparison |
|---|---|---|
| (Capacity after Storage/ Capacity before Storage) × 100 (%) | 99 | 93 |

As shown in Table 2, a lithium secondary battery using an electrode plate for positive electrode prepared according to the production method of the present invention is found to show little degradation in capacity even under a high temperature storage condition.

INDUSTRIAL USABILITY

As described in the above, the present invention makes it possible for a secondary battery to suppress the degradation in charge/discharge capacity and storage characteristics to an extremely small extent when the battery is used in repeated charge/discharge operations.

In addition, even under such a stringent condition as the battery is in storage at high temperatures for a long period, the degradation in charge/discharge capacity can be suppressed to a minimum. Also, a composition layer formed of an active material acting as the principal ingredient thereof is prevented from peeling off the current collector of an electrode plate during the assembly work of batteries, thereby enabling the enhancement of workability involved with the assembly work of the batteries.

What is claimed is:

1. An electrode plate for a battery, the electrode plate comprising: (1) a surface having formed thereon an oxide layer, the oxide layer being formed by applying a boehmite treatment to the electrode plate surface, and (2) a layer of an electrode active material on the oxide layer; wherein said electrode active material participates in the charge and discharge reactions of said battery.

2. The electrode plate as cited in claim 1 wherein the electrode plate is included in the battery.

3. The electrode plate as cited in claim 2, wherein the oxide layer has a thickness of 0.5 $\mu$m to 5 $\mu$m.

4. The electrode plate as cited in claim 1, wherein the oxide layer has a thickness of 0.5 $\mu$m to 5 $\mu$m.

5. The electrode plate as cited in claim 1 wherein the electrode plate is selected from the group consisting of a negative electrode plate and a positive electrode plate.

6. The electrode plate as cited in claim 1 wherein said electrode active material is in a paste.

7. The electrode plate as cited in claim 6 wherein the paste is a dried paste.

8. The electrode plate as cited in claim 1, wherein the electrode active material is $LiCoO_2$.

9. The electrode plate as cited in claim 1, wherein the electrode active material is graphite particles.

10. A method for producing an electrode plate for a lithium secondary battery, the method comprising the steps of:

providing an electrode plate;

forming an oxide layer on the electrode plate by applying a boehmite treatment to the electrode plate;

applying a paste comprising an electrode active material to the oxide layer; and drying the paste.

11. The method as cited in claim 10, wherein the oxide layer has a thickness of 0.5 μm to 5 μm.

12. The method as cited in claim 11, wherein said electrode active material is selected from the group consisting of $LiCoO_2$ and graphite particles.

13. A battery comprising, in a battery case; a positive electrode; a negative electrode; an electrolyte between the positive electrode and the negative electrode; and a separator between the positive electrode and the negative electrode; in which at least one of said positive electrode and said negative electrode comprises (1) an electrode plate comprising a surface having formed thereon an oxide layer, the oxide layer being formed by applying a boehmite treatment to said surface, and (2) a layer comprising an electrode active material on said oxide layer, and wherein said electrode plate comprises aluminum.

14. The battery as cited in claim 13, wherein the oxide layer has a thickness of 0.5 μm to 5 μm.

15. The battery as cited in claim 14, wherein the at least one of said positive electrode and said negative electrode is said positive electrode.

16. The battery as cited in claim 15, wherein the electrode active material is $LiCoO_2$.

17. The battery as cited in claim 14, wherein the at least one of said positive electrode and said negative electrode is said negative electrode.

18. The battery as cited in claim 17, wherein the electrode active material is graphite particles.

19. The battery as cited in claim 14, wherein the at least one of said positive electrode and said negative electrode is said positive electrode and said negative electrode.

20. The battery as cited in claim 15, wherein said electrode active material is in a paste.

* * * * *

UNITED STATES PATENT AND TRADEMARK OFFICE
CERTIFICATE OF CORRECTION

PATENT NO. : 6,787,266 B1
DATED : September 7, 2004
INVENTOR(S) : Tatsuya Hashimoto et al.

It is certified that error appears in the above-identified patent and that said Letters Patent is hereby corrected as shown below:

Column 7,
Line 12, should read -- : --.

Column 8,
Line 18, should read -- 14 --.

Signed and Sealed this

Thirty-first Day of May, 2005

JON W. DUDAS
*Director of the United States Patent and Trademark Office*